US007543167B2

(12) United States Patent
Nakano

(10) Patent No.: US 7,543,167 B2
(45) Date of Patent: Jun. 2, 2009

(54) INFORMATION PROCESSING APPARATUS AND POWER CONTROL METHOD FOR USE IN THE SAME

(75) Inventor: Masanori Nakano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 381 days.

(21) Appl. No.: 11/213,951

(22) Filed: Aug. 30, 2005

(65) Prior Publication Data

US 2006/0095799 A1    May 4, 2006

(30) Foreign Application Priority Data

Oct. 29, 2004   (JP)   ............................ 2004-316514

(51) Int. Cl.
*G06F 1/26* (2006.01)
*G06F 1/30* (2006.01)
*G06F 1/32* (2006.01)

(52) U.S. Cl. ........................ 713/320; 713/300; 713/310; 713/321; 713/322; 713/323; 713/324; 713/330; 713/340

(58) Field of Classification Search ................ 713/300, 713/310, 320–324, 330, 340
See application file for complete search history.

(56) References Cited

U.S. PATENT DOCUMENTS

| | | | | |
|---|---|---|---|---|
| 6,313,609 | B1 * | 11/2001 | Brink | 320/132 |
| 6,664,764 | B1 * | 12/2003 | Odaohhara | 320/132 |
| 7,103,786 | B2 * | 9/2006 | Chen et al. | 713/320 |
| 7,228,242 | B2 * | 6/2007 | Read et al. | 702/57 |
| 7,243,243 | B2 * | 7/2007 | Gedeon | 713/300 |
| 2002/0124192 | A1 * | 9/2002 | Odaohhara | 713/300 |
| 2003/0159076 | A1 * | 8/2003 | Delisle et al. | 713/300 |
| 2003/0193472 | A1 * | 10/2003 | Powell | 345/102 |
| 2003/0226049 | A1 * | 12/2003 | Mantani | 713/322 |
| 2004/0135540 | A1 | 7/2004 | Ogawa | |
| 2004/0236969 | A1 * | 11/2004 | Lippert et al. | 713/300 |

FOREIGN PATENT DOCUMENTS

| | | |
|---|---|---|
| JP | 5-66866 | 3/1993 |
| JP | 2003-259191 | 9/2003 |
| JP | 2003-309516 | 10/2003 |

\* cited by examiner

*Primary Examiner*—Thomas Lee
*Assistant Examiner*—Fahmida Rahman
(74) *Attorney, Agent, or Firm*—Finnegan, Henderson, Farabow, Garrett & Dunner, L.L.P.

(57) ABSTRACT

An information processing apparatus that is powerable by a battery includes a main body in which the battery is detachably mounted, a processor that is provided in the main body, a unit that acquires battery type information that is indicative of a rating of the battery from the battery that is mounted in the main body, and a control unit that executes a power control process that sets an upper limit of an operation speed of the processor in accordance with the acquired battery type information.

10 Claims, 4 Drawing Sheets

| Battery type | CPU type | AC adapter | LCD luminance | Wireless output | CPU speed | Shut-down |
|---|---|---|---|---|---|---|
| Rating=low | High Frequency | — | — | — | — | ○ |
| | Low Frequency | ○ | Maximum | High | Maximum | — |
| | Low Frequency | × | Low | Low | 25% down | — |
| Rating=high | — | — | Maximum | High | Maximum | — |

F I G. 3

US 7,543,167 B2

INFORMATION PROCESSING APPARATUS AND POWER CONTROL METHOD FOR USE IN THE SAME

CROSS-REFERENCE TO RELATED APPLICATIONS

This application is based upon and claims the benefit of priority from prior Japanese Patent Application No. 2004-316514, filed Oct. 29, 2004, the entire contents of which are incorporated herein by reference.

BACKGROUND

1. Field The present invention relates to an information processing apparatus such as a personal computer, and a power control method for use in the information processing apparatus.

2. Description of the Related Art

In recent years, various types of notebook personal computers that can be battery-driven have been developed. For notebook personal computers, dedicated batteries are prepared in accordance with their power consumptions.

In addition, for electronic devices such as cameras, various types of dry cells, such as alkali cells, nickel-metal hydride cells and lithium cells, are used as batteries.

Jpn. Pat. Appln. KOKAI Publication No. 2003-259191 discloses an electronic apparatus having a function of varying the luminance of a display in accordance with the kind of a dry cell that is mounted.

In the meantime, there has recently been a case in which a lineup of models of the same-type notebook personal computer, wherein different kinds of CPUs are mounted, has been introduced. The power consumption of the system varies greatly depending on the CPU to be mounted. Even in the same-type notebook personal computers, it is necessary to prepare a plurality of kinds of batteries on a model-by-model basis, which have different ratings such as output powers.

If a low-output-power battery, which is designed for a model with a low-speed CPU, is mounted in a notebook personal computer with a high-speed CPU, the power consumption of the system exceeds the battery rating. Consequently, such a problem would arise that the system may suddenly be powered off during an operation. Even if such a problem does not occur, the battery driving time would become extremely short.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view for explaining an example of the structure of a power management table that is used in the computer shown in FIG. 1.

DETAILED DESCRIPTION

An embodiment of the present invention will now be described with reference to the accompanying drawings.

Figure 1:
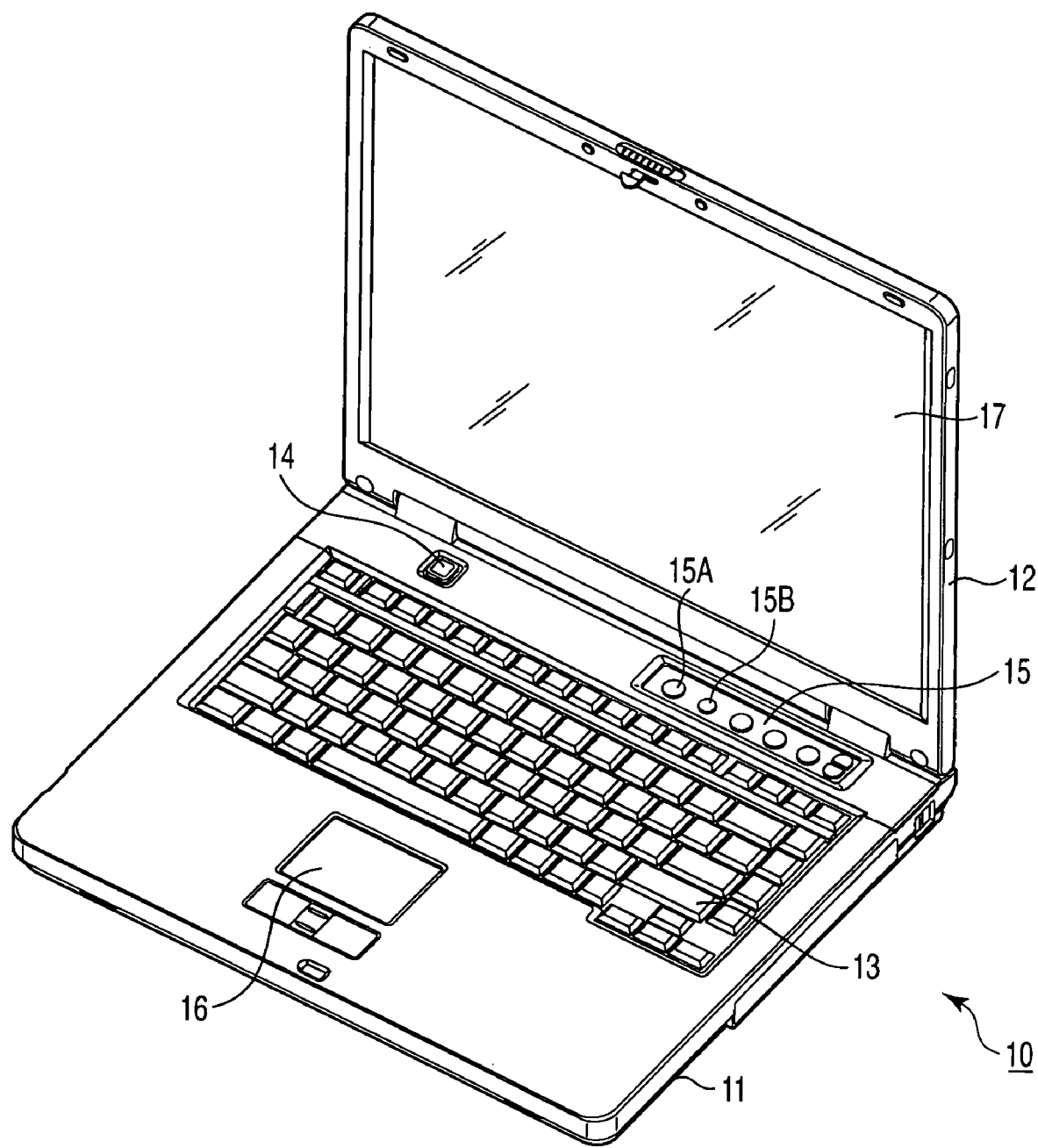
FIG. 1 is a perspective view that shows the external appearance of a computer according to an embodiment of the present invention.
Figure 2:
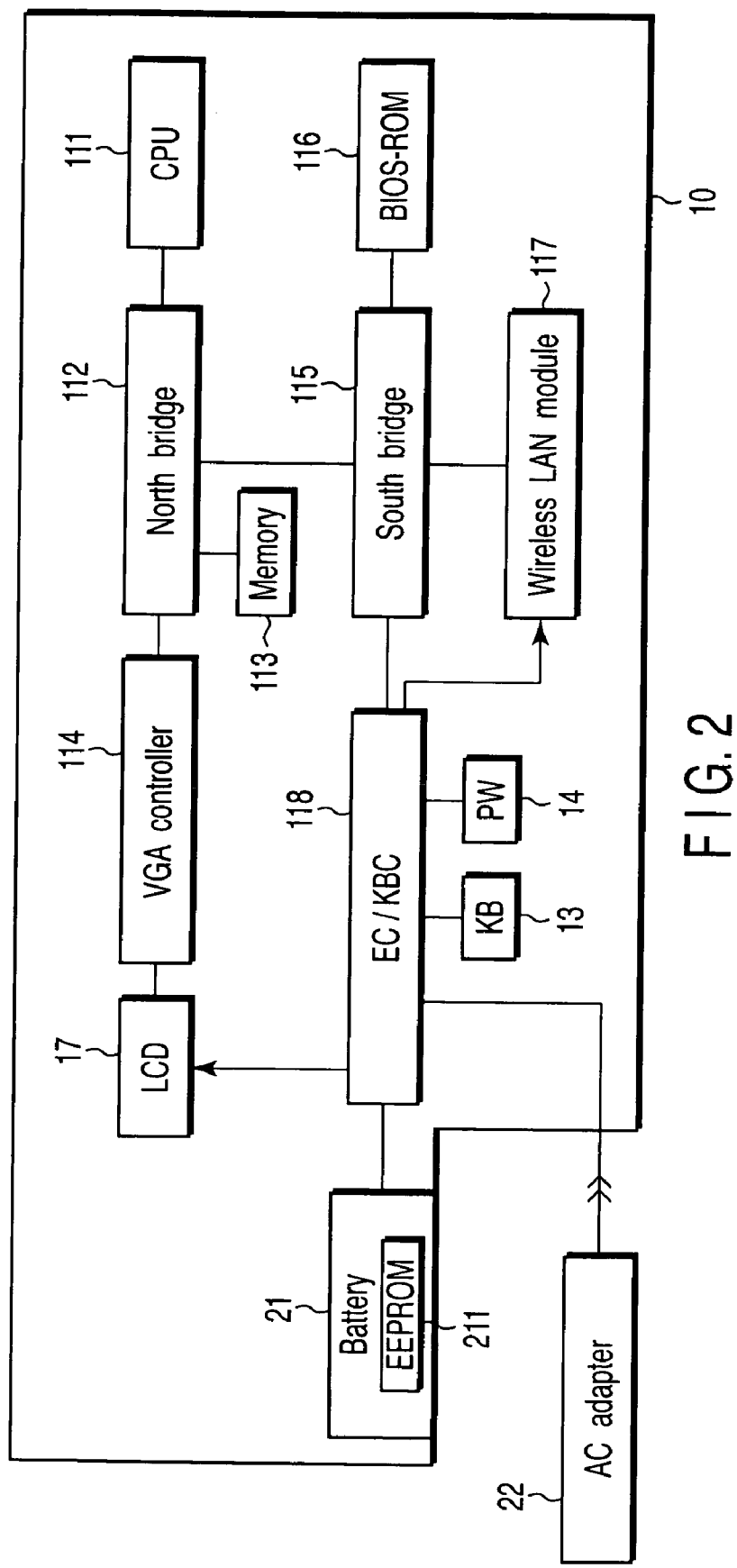
FIG. 2 is a block diagram that shows a system configuration of the computer shown in FIG. 1.

Referring to FIG. 1 and FIG. 2, the structure of an information processing apparatus according to the embodiment of the invention is described. The information processing apparatus is realized, for example, as a notebook portable personal computer 10.

FIG. 1 is a perspective view that shows the state in which a display unit of the notebook personal computer 10 is opened. The computer 10 comprises a computer main body 11 and a display unit 12. A display device that is composed of an LCD (Liquid Crystal Display) 17 is built in the display unit 12. The display screen of the LCD 17 is positioned at an approximately central part of the display unit 12.

The display unit 12 is attached to the computer main body 11 such that the display unit 12 is freely rotatable between an open position and a closed position. The computer main body 11 has a thin box-shaped casing in which a battery is detachably mounted. The battery is mounted in a battery receiving portion that is provided, for example, at a bottom surface of the computer main body 11.

A keyboard 13, a power button 14 for powering on/off the computer 10, an input operation panel 15 and a touch pad 16 are disposed on the top surface of the computer main body 11.

The input operation panel 15 is an input device that inputs an event corresponding to a pressed button. The input operation panel 15 has a plurality of buttons for activating a plurality of functions. The buttons include a TV activation button 15A and a DVD/CD activation button 15B. The TV activation button 15A is a button for activating a TV function for reproducing and recording TV broadcast program data. When the TV activation button 15A is pressed by the user, a TV application program for executing the TV function is automatically started.

In this computer, a general-purpose main operating system and a purpose-specific sub-operating system for processing AV (audio/video) data are installed. The TV application program is a program that runs on the sub-operating system.

When the power button 14 is pressed by the user, the main operating system is activated. On the other hand, when the TV activation button 15A is pressed by the user, the sub-operating system, and not the main operating system, is started, and the TV application program is automatically executed. The sub-operating system has only a minimum function for executing the AV function. The time that is needed to boot up the sub-operating system is much shorter than the time that is needed to boot up the main operating system. Thus, only by pressing the TV activation button 15A, the user can immediately execute TV viewing/recording.

The DVD/CD activation button 15B is a button for reproducing video content that is recorded on a DVD or CD. When the DVD/CD activation button 15B is pressed by the user, a video reproduction application program for reproducing video content is automatically activated. The video reproduction application program, too, is an application program that runs on the sub-operating system. When the DVD/CD activation button 15B is pressed by the user, the sub-operating system, and not the main operating system, is started, and the video reproduction application program is automatically executed.

Referring now to FIG. 2, a system configuration of the computer 10 is described.

The computer 10, as shown in FIG. 2, includes a CPU 111, a north bridge 112, a main memory 113, a VGA (Video Graphics Array) controller 114, a south bridge 115, a BIOS- ROM 116, an embedded controller/keyboard controller IC (EC/KBC) 118, and a wireless LAN module 117.

The CPU 111 is a processor that is provided for controlling the operation of the computer 10. The CPU 111 executes a main operating system (main OS)/sub-operating system (sub-OS) and various application programs.

The CPU 111 also executes a system BIOS (Basic Input/Output System) that is stored in the BIOS-ROM 116. The system BIOS is a program for hardware control. The system BIOS has a function of cooperating with the embedded controller/keyboard controller IC (EC/KBC) 118 and executing a power control process of the computer 10. The power control process is a process for stably operating the system for a long time, regardless of the type of a battery 21 that is mounted in the computer main body 11. The power control process includes a process for setting the upper limit value of the operation speed of the CPU 111 in accordance with the type (rating) of the battery 21 mounted in the computer main body 11. In this case, the upper limit value of the operation speed of the CPU 111 is so set that the power consumption of the computer 10 may not exceed the output power of the battery 21 mounted in the computer main body 11.

The north bridge 112 is a bridge device that connects a local bus of the CPU 111 and the south bridge 115. The north bridge 112 includes a memory controller that access-controls the main memory 113. The north bridge 112 has a function of executing communication with the VGA controller 114 via, e.g. an AGP (Accelerated Graphics Port) bus.

The VGA controller 114 is a display controller for controlling the LCD 17 that is used as a display monitor of the computer 10. The VGA controller 114 includes a video memory (VRAM) and generates a video signal, which forms a display image to be displayed on the LCD 17, on the basis of display data that is written in the video memory by the OS/application program.

The wireless LAN module 117 is a wireless communication unit that executes wireless communication with outside. For example, the wireless LAN module 117 is configured to execute wireless communication based on IEEE 802.11 standards.

The embedded controller/keyboard controller IC (EC/KBC) 118 is a 1-chip microcomputer in which an embedded controller for power management and a keyboard controller for controlling the keyboard (KB) 13 and touch pad 16 are integrated. The embedded controller/keyboard controller IC (EC/KBC) 118 has a function of powering on/off the computer 10 in response to the user's operation of the power button 14. Further, the embedded controller/keyboard controller IC (EC/KBC) 118 is capable of powering on/off the computer 10 in response to the user's operation of the TV activation button 15A or DVD/CD activation button 15B.

The EC/KBC 118 includes a power supply circuit that generates an operational power supply voltage for each component from an external power supply that is provided by an AC adapter 22 or from the power supply of the battery 21. The EC/KBC 118 also has a function of executing communication with the battery 21. The EC/KBC 118 and the battery 21 are connected over, e.g. an SM (System Management) bus. Communication between the EC/KBC 118 and battery 21 is executed over the SM bus.

The battery 21 supports the Smart Battery specification, and includes an EEPROM 211 that stores battery type information representative of the type of battery 21. The battery type information includes information that is indicative of the rating (rated output (V), rated capacity (Ah)) of the battery 21.

The EC/KBC 118 executes communication with the battery 21, thereby acquiring battery type information from the battery 21.

The EC/KBC 118 has a function of determining whether the AC adapter 22 (external power supply) is connected to the computer 10.

Next, referring to FIG. 3, the power supply control process that is executed by the BIOS is described.

FIG. 3 shows a power management table that is used in the power supply control process. The power management table is stored, for example, in the EC/KBC 118 or BIOS-ROM 116. The power management table is a table that defines the relationship between the battery type and operation performances of each device. The battery type indicates the type (rating) of the battery 21 that is mounted in the computer 10. Assume now that two types of batteries, which have different ratings (rated output, rated capacity), are prepared as batteries for the computer 10.

In the power management table, as shown in FIG. 3, a [Battery Type] field, a [CPU Type] field, an [AC Adapter] field, an [LCD Luminance] field, a [Wireless Output] field, a [CPU Speed] field and a [Shut-Down] field are defined.

The [Battery Type] field indicates the type (rating) of the battery 21. In this embodiment, battery types are classified into two types, i.e. [Rating=Low] and [Rating=High]. The [CPU Type] field indicates the type (operation frequency) of the CPU 111. In this embodiment, the types of CPU 111 are classified into two CPU types, i.e. [High Frequency] and [Low Frequency], depending on whether the operation frequency is lower than 3.0 GHz. The [AC Adapter] field indicates whether the AC adapter (external power supply) 22 is connected to the computer 10. Symbol "○" indicates that the AC adapter is connected.

The [LCD Luminance] field designates the upper limit of the display luminance of the LCD 17. The display luminance of the LCD 17 can be adjusted, for example, by a voltage value for driving the backlight of the LCD 17. The voltage for driving the backlight of the LCD 17 is output from the EC/KBC 118. The [Wireless Output] field designates a transmission output power of the wireless LAN module 117. The information that designates the transmission output power is set by the EC/KBC 118 in a control register that is provided in the wireless LAN module 117.

The [CPU Speed] field designates the upper limit of the operation speed of the CPU 111. The operation speed of the CPU 111 can be controlled, for example, by varying the frequency of the clock signal that is supplied to the CPU 111. The [Shut-Down] field designates whether the activation of the computer 10 is to be prohibited or not. Symbol "○" indicates that the activation of the computer 10 is prohibited.

In FIG. 3, symbol "-" indicates "don't care" (invalid value).

Figure 4:
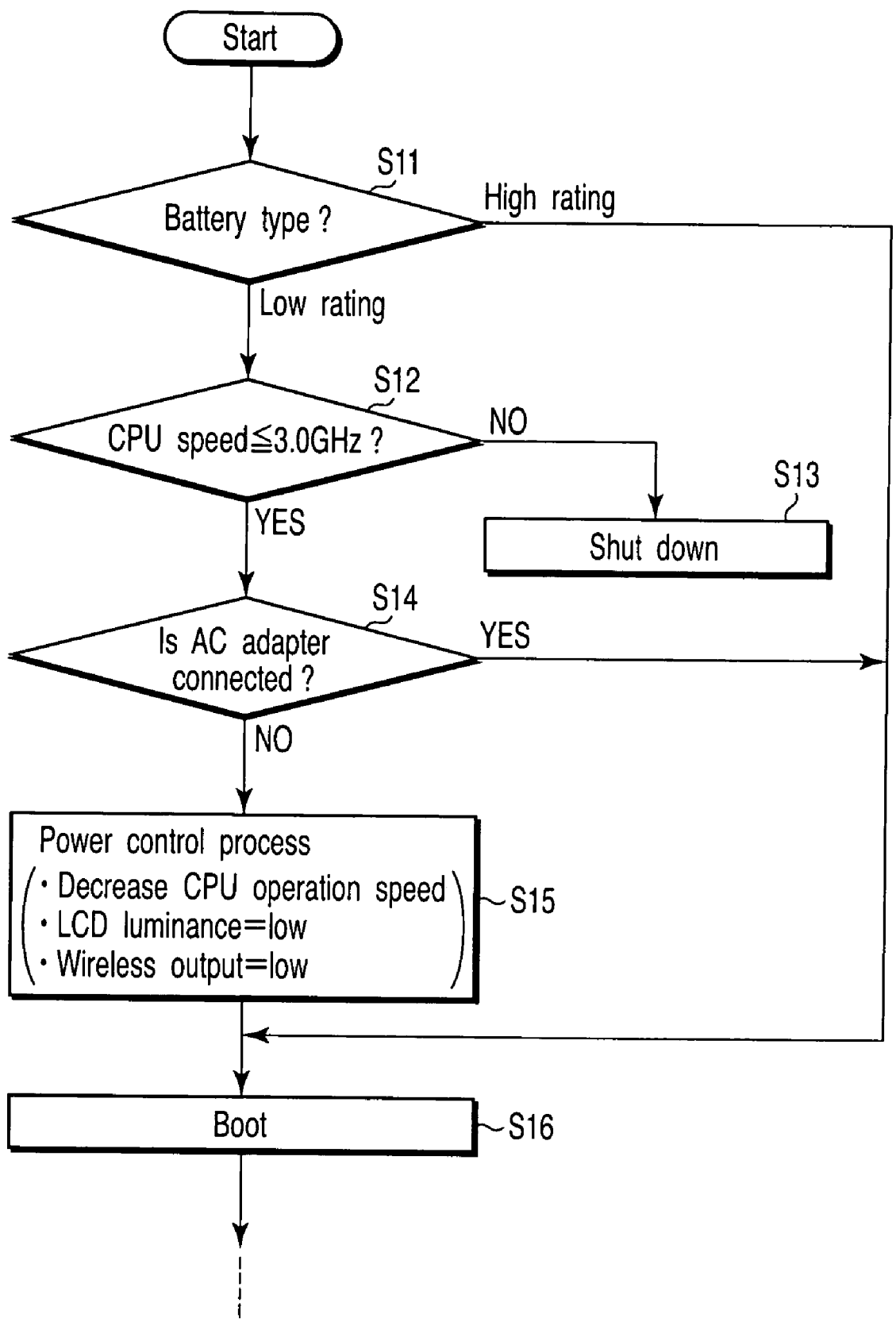
FIG. 4 is a flow chart illustrating the procedure of a power control process that is executed by the computer shown in FIG. 1.

Next, the procedure of the power control process that is executed by the BIOS according to the power management table is described with reference to a flow chart of FIG. 4.

When the computer 10 is powered on, the BIOS executes the following process.

To start with, the BIOS acquires battery type information of the battery 21 from the battery 21 via the EC/KBC 118, and determines the type (rating) of the battery 21 (step S11).

If the battery type of the battery 21 is [Rating=Low], the BIOS determines the type of the CPU 111 that is mounted in the computer 10 (step S12). If the type of the CPU 111 is [High Frequency] (NO in step S12), the BIOS determines that the current combination of the battery type and the CPU type ([Rating=Low] & [High Frequency]) is the combination with which the activation (boot-up) of the computer 10 should be prohibited. In this case, the BIOS immediately shuts down (powers off) the computer 10, irrespective of the connection/disconnection of the AC adapter 22, and prohibits the boot-up of the computer 10, that is, the boot-up of the operating system (step S13). If the AC adapter 22 is connected to the computer 10, it is possible to activate (boot up) the computer 10 even in the case of the combination of [Rating=Low] & [High Frequency]. However, if the AC adapter 22 is removed while the computer 10 is in operation, there is a danger that the computer 10 may immediately be powered off. The process in step S13 prevents the danger from occurring.

On the other hand, if the type of the CPU 111 is [Low Frequency] (YES in step S12), the BIOS determines that the current combination of the battery type and the CPU type ([Rating=Low] & [Low Frequency]) is the combination that permits activation (boot-up) of the computer 10. Then, the BIOS determines whether the AC adapter 22 is connected to the computer 10 (step S14).

If the AC adapter 22 is not connected (NO in step S14), the BIOS executes the power control process according to the current combination of the battery type and the CPU type ([Rating=Low] & [Low Frequency]) (step S15). In step S15, the BIOS executes the process for setting the upper limits of the CPU operation speed, LCD luminance and wireless output so that the power consumption of the computer may not exceed the output power of the battery 21. The upper limit value of the CPU operation speed, which corresponds to the combination of [Rating=Low] & [Low Frequency], is predetermined. For example, the upper limit value of the CPU operation speed is a value that is lower than the maximum speed of the CPU 111 by 25%. It is possible, however, that the BIOS may calculate the output power of the battery 21 from the rating of the battery 21 and may set the upper limit value of the CPU operation speed on the basis of the calculated value of the output power.

Following the execution of the power control process in step S15, the BIOS executes the boot process for booting up the operating system (step S16).

If the AC adapter 22 is connected (YES in step S14), the BIOS skips step S15 and prohibits the execution of the power control process. In this case, the upper limit values of the CPU operation speed, LCD luminance and wireless output are not set, and the CPU 111 is enabled to operate at its maximum operation speed. In addition, the display luminance of the LCD 17 is set at its maximum value, and the transmission output power of the wireless LAN module 117 is also set at its maximum value. Thereafter, the BIOS executes the boot process for booting up the operating system (step S16).

If the battery type of the battery 21 is [Rating=High], the BIOS skips the process of steps S12 to S15 and immediately executes the boot process (step S16).

As has been described above, according to the present embodiment, the operation performance of each device is limited in accordance with the type (rating) of the battery 21 that is mounted in the computer 10. It is thus possible to prevent power consumption from exceeding the performance (output power) of the battery 21. Therefore, no matter which type of battery is mounted in the computer 10, the stable operation of the system is ensured.

Besides, since the battery is not excessively discharged, it is possible to prevent such a problem that the battery driving time becomes extremely short. Moreover, since excessive discharge of the battery does not occur, the lifetime of the battery can be elongated.

In the present embodiment, the CPU speed, LCD luminance and wireless output are limited. Alternatively, since the power consumption of the CPU is highest of all the components of the computer 10, the upper limit of the CPU speed alone may be set in accordance with the type (rating) of the mounted battery 21 so that the power consumption of the computer 10 may not exceed the output power of the battery 21.

In this embodiment, the power control process, which supports two types of batteries ([Rating=Low] and [Rating=High]), has been described. Alternatively, it is possible to execute a power control process that supports three types of batteries, i.e. [Rating=Low], [Rating=Middle] and [Rating=High]. In this case, for example, when a battery of [Rating=Middle] is mounted, the BIOS executes a process for setting the upper limit of the CPU speed at a value that is lower than the maximum speed of the CPU by 10%. In addition, when a battery of [Rating=Low] is mounted, the BIOS executes a process for setting the upper limit of the CPU speed at a value that is lower than the maximum speed of the CPU by 25%.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus that is powerable by a battery, comprising:
   a main body in which one of a first type battery or a second type battery having different ratings is detachably mounted, a rating of the first type battery being lower than a rating of the second type battery;
   a processor that is provided in the main body;
   an acquiring unit configured to acquire rating information, wherein the rating information is based on battery type information stored in a battery that is mounted in the main body, that is indicative of a rated output and a rated capacity of the battery that is mounted in the main body;
   a first determining unit configured to determine whether the battery that is mounted in the main body is the first type battery or the second type battery based on the acguired rating information;
   a second determining unit configured to determine whether a type of the processor is a first type processor with an operating frequency that is higher than a specified frequency, or a second type processor with an operating frequency that is lower or equal to the specified frequency when the battery that is mounted in the main body is the first type battery; and
   a controlling unit configured to execute a power control process to set an upper limit of an operation speed of the processor in accordance with the determined type of the processor when the battery that is mounted in the main body is the first type battery.

2. The information processing apparatus according to claim 1, wherein the power control process sets the upper limit of the operation speed of the processor such that power consumption of the information processing apparatus does not exceed an output power of the battery mounted in the main body.

3. The information processing apparatus according to claim 1, wherein the power control process includes a process of setting the upper limit of the operation speed of the processor and a process of setting an upper limit of a display luminance of a display that is provided on the information processing apparatus.

4. The information processing apparatus according to claim 1, further comprising a wireless communication unit that executes wireless communication with an external device,
wherein the power control process includes a process of setting the upper limit of the operation speed of the processor and a process of limiting a transmission output power of the wireless communication unit to a predetermined value.

5. The information processing apparatus according to claim 1, further comprising:
a third determining unit which determines whether an external power supply is connected to the information processing apparatus; and
a prohibiting unit which prohibits execution of the power control process in a case where the external power supply is connected to the information processing apparatus.

6. A power control method for controlling power consumption of an information processing apparatus that is powerable by a battery, the information processing apparatus including a main body in which a first type battery or a second type battery is detachably mounted, a rating of the first type battery being lower than a rating of the second type battery, and a processor that is provided in the main body, the method comprising:
acquiring rating information that is indicative of a rated output and a rated capacity of the battery from the battery that is mounted in the main body, wherein the rating information is based on battery type information stored in the battery that is mounted in the main body;
determining whether the battery that is mounted in the main body is the first type battery or the second type battery based on the acquired rating information;
determining whether a type of the processor is a first type processor with an operating frequency that is higher than a specified frequency or a second type processor with an operating frequency that is lower than or equal to the specified frequency when the battery that is mounted in the main body is the first type battery; and
executing a power control process that sets an upper limit of an operation speed of the processor in accordance with the determined type of the processor when the battery that is mounted in the main body is the first type battery.

7. The power control method according to claim 6, wherein the power control process sets the upper limit of the operation speed of the processor such that a power consumption of the information processing apparatus does not exceed an output power of the battery mounted in the main body.

8. The power control method according to claim 6, wherein the power control process includes a process of setting the upper limit of the operation speed of the processor and a process of setting an upper limit of a display luminance of a display that is provided on the information processing apparatus.

9. The power control method according to claim 6, wherein the information processing apparatus includes a wireless communication unit that executes wireless communication with an external device, and
the power control process includes a process of setting the upper limit of the operation speed of the processor and a process of limiting a transmission output power of the wireless communication unit to a predetermined value.

10. The power control method according to claim 6, further comprising:
determining whether an external power supply is connected to the information processing apparatus; and
prohibiting execution of the power control process in a case where the external power supply is connected to the information processing apparatus.

* * * * *